March 15, 1960 R. A. ARRISON, JR 2,929,000

MEANS FOR AND METHOD OF INTERVAL TIMING

Filed June 29, 1953 2 Sheets-Sheet 1

INVENTOR:-
ROBERT A. ARRISON JR.
BY:-
Junius F. Cook, Jr.
ATTORNEY

March 15, 1960 R. A. ARRISON, JR 2,929,000

MEANS FOR AND METHOD OF INTERVAL TIMING

Filed June 29, 1953 2 Sheets-Sheet 2

INVENTOR:-
ROBERT A. ARRISON JR.
BY:-
Junius F. Cook, Jr.
ATTORNEY

United States Patent Office 2,929,000

Patented Mar. 15, 1960

2,929,000

MEANS FOR AND METHOD OF INTERVAL TIMING

Robert A. Arrison, Jr., Whitefish Bay, Wis., assignor to General Electric Company, a corporation of New York Application June 29, 1953, Serial No. 364,697

20 Claims. (Cl. 317—142)

The present invention relates in general to interval timing, and has more particular reference to the timing of exposure intervals, the invention pertaining specifically to the provision of means for timing relatively short exposure intervals of the sort frequently employed in X-ray photography.

Timing devices may consists of apparatus, released or otherwise put into operation, at the start of an interval to be timed, for causing an operable device to function, at the conclusion of the timed interval, for the accomplishment of a desired operation at the end of the timed interval, such desired operation usually comprising the disablement of operating equipment. Where the operating equipment consists of X-ray apparatus operable to produce rays for X-ray photography, or for other ray exposure purposes, during intervals of limited duration, exposure timing equipment may comprise means for starting the equipment in operation for the production of X-rays of desired intensity, at the commencement of the exposure interval, and means operable to disable the X-ray equipment, at the conclusion of the exposure interval.

X-ray photographs are commonly called radiographs and may be produced by causing rays, emitted from a suitable source, to traverse the object to be pictured and impinge upon a layer of ray sensitive material, thus exposing the material and creating a latent picture image therein. The sensitive material may then be treated chemically to develop the latent image as a visible picture therein.

Apparatus for timing the operation of X-ray generating equipment commonly comprises switch means controllingly connected with the generating equipment, and operating means for causing the switch means to close and to open, respectively, at the beginning and at the conclusion of the exposure interval, to thereby initiate and terminate the effective operation of the X-ray equipment. Such operating means preferably comprises adjustable apparatus adapted to measure any selected elapsed time interval, within the range of the equipment, and means for starting the timing apparatus in operation upon the closure of the switch means controllingly associated with the ray generating equipment, the timing apparatus being operatively associated with the controlling switch means to open the same precisely at the conclusion of the ray exposure interval.

As disclosed, for example, in United States Letters Patent No. 2,325,860, of August 3, 1943, covering an Impulse Timer invented by Arthur J. Kizaur, mechanical timing mechanism has heretofore been provided for opening and closing exposure controlling electrical switches for the timing of X-ray exposure intervals. In United States Letters Patent No. 2,401,289, of May 28, 1946, covering the joint invention of Russell H. Morgan and Paul C. Hodges in X-Ray Exposure Timing Apparatus, it has been proposed to measure X-ray exposure intervals in terms of the aggregate quanta of X-rays delivered by the ray generating apparatus during the exposure interval, and to terminate the exposure interval as and when the measured ray quanta reaches a selected total value.

Exposure intervals in the making of X-ray pictures have been thus determined by disposing suitable ray sensitive detector means in position to receive impingement of picturing rays, after the same have passed through the object being pictured, whereby to excite the detector element in proportion to the total ray quanta applied upon the sensitive picturing material during the interval being measured. Integrating means for determining aggregate ray quanta may be provided, in association with the detector, such means conveniently comprising a condenser adapted to be progressively charged during the exposure interval in proportion to the ray quanta applied to the detector means. The condenser, in turn, may be connected with operable means adapted to be actuated as and when the condenser becomes charged to a predetermined level corresponding with the application, upon the picturing material, of the total ray quanta required to produce optimum exposure of the sensitive material. Such operable means may conveniently comprise a normally inactive electron flow valve, such as a thyratron, adapted to "fire," thereby becoming operative when the charge on the integrating condenser reaches a selected value.

The thyratron, of course, may be connected in the operating circuit of a normally closed relay switch controllingly connected with the X-ray generating apparatus to disable the same upon the opening of the relay switch as and when the thyratron is actuated as aforesaid.

An inherent characteristic of relay switches is that the same do not operate instantly. Because of inertia forces, there is always a time delay or lag interval between the instant at which the thyratron fires and the moment of effective response of the thyratron controlled relay switch in disabling the ray generating apparatus, with which the switch is connected, and thus terminating the exposure interval. While this time delay may be relatively short, that is to say, of the order of 0.02 second, the delay, nevertheless, may represent a substantial and undesirable prolongation of an exposure interval, particularly where the exposure interval itself is of short duration. Where the exposure interval duration is of the order of, say, one-fifth second, a prolongation of the interval by as much as 0.02 second will represent a 10% increase in the duration of the exposure interval. The prolongation, by 0.02 second, of an exposure interval of one-fiftieth second in duration, however, represents a 100% increase in the duration of the exposure intreval.

An important object of the present invention is to provide an interval timing system of the character described having means for anticipating the end of timed interval and for starting operable equipment, such as a thyratron actuated relay switch, in operation, in advance of the end of the interval being timed, in order to offset the lag or delay in the effective operation of such operable means, whereby to accomplish a desired control function precisely at the end of the interval being timed.

Another important object is to provide for compensating an interval timing system of the character described comprising a relay actuating thyratron valve under the control of an integrating condenser, by applying increasingly negative bias upon the thyratron throughout the interval being timed, in order to cause the thyratron to fire sufficiently in advance of the end of the interval being timed to compensate for the operational lag of the switch actuated by the thyratron; a further object being to exponentially increase the negative bias on the thyratron.

Another important object is to compensate for the operational lag time of mechanical elements in an interval timing system embodying a thyratron valve for actuating said elements at the end of a timed interval, which consists in determining the operational lag interval of said elements and then providing for applying a variable negative bias on the thyratron valve to cause the same to fire in advance of the end of the interval being timed by an interval equal to the lag interval of said elements, regardless of the duration of the interval being timed.

Another important object is to compensate for the operational lag time of mechanical elements in an X-ray photographic timing system embodying a thyratron valve for actuating said elements at the end of an exposure interval, which consists in determining the operational lag interval of said elements and then providing for applying a variable negative bias on the thyratron valve to cause the same to fire in advance of the end of the interval being timed by an interval equal to the lag interval of said elements, regardless of the intensity of quality of the rays used for picturing purposes.

Another important object is to employ a thyratron valve control circuit embodying resistance and capacity factors for applying a variable negative bias on the relay actuating thyratron valve.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings.

Figure 1:
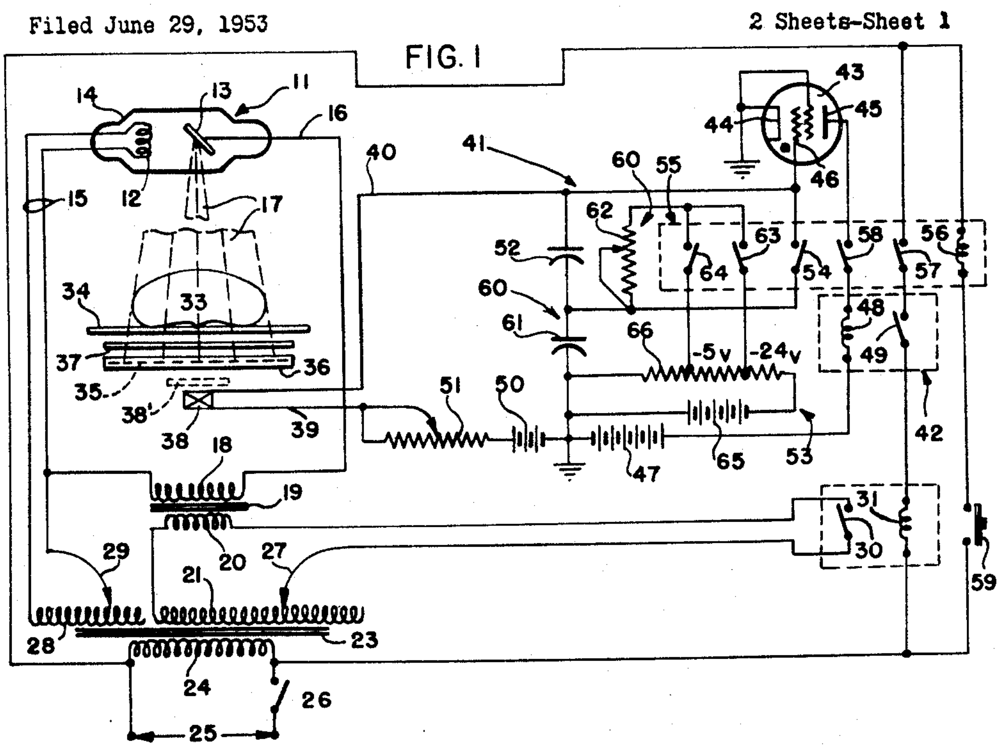
Fig. 1 is a diagrammatic view of interval timing apparatus embodying the present invention.

To illustrate the invention, Fig. 1 of the drawings shows a controllable source of X-rays comprising a conventional X-ray generating tube 11 having an electron emitting cathode 12, and an anode 13 forming an electron target disposed in position to receive the impact of electrons emitted at the cathode. The anode and cathode are mounted in spaced, facing relationship within a sealed and evacuated envelope 14. As shown, the cathode 12 comprises an electron emitting filament connected with conductors 15 which extend outwardly of the envelope 14, through suitable seals, for the purpose of applying cathode energizing power from a suitable external power source to excite the filament for electron emission. The anode 13 is also electrically connected, through a suitable seal, with conductor means 16 outwardly of the envelope.

X-rays, of course, are generated, in the tube 11, as the result of impingement, on the anode 13, of electrons emitted by the cathode and caused to travel thence at high speed toward the anode under the influence of electron driving potential applied between the anode and cathode. The tube 11 may thus be caused to operate for the generation of X-rays by energizing the cathode for electron emission, as by connecting the conductors 15 with a suitable source of cathode energizing power, while simultaneously applying an electron driving potential between the cathode and the anode, as by connecting one of the conductors 15 and the conductor 16 with a suitable source of electron driving potential outwardly of the envelope. Electrons emitted by the filament 12 may travel thence as an electron beam under the influence of the anode-cathode electron driving potential, and may impinge upon the facing target surface of the anode 13, thereby constituting the target surface as an X-ray source from which the generated X-rays may be emitted outwardly of the envelope in the form of an X-ray beam 17.

To thus operate the tube 11 as an X-ray generator, the anode conductor 16 and one of the cathode conductors 15 may be connected with the secondary winding 18 of a step-up transformer 19, in order to constitute said secondary winding 18 as the immediate source of electron driving potential applied between the cathode and anode of the generator tube. To energize the transformer 19, its primary winding 20 may be connected with the secondary winding 21 of a step-up transformer 23. The primary winding 24 of this step-up transformer may be connected with a suitable power source 25, preferably through a disconnecting switch 26. Means, such as an adjustable connection 27 with the secondary winding 21, may be and preferably is provided for varying the potential applied between the anode and cathode. To energize the cathode 12 for electron emission, the conductors 15 may be connected with a secondary winding 28 of the transformer 23, preferably through an adjustable connection 29.

In order to start and stop the generation of X-rays, a control switch 30 may be interposed at any convenient location in the anode-cathode power supply system, the switch 30, as shown, being preferably connected in the power supply circuit to the primary winding of the transformer 19. The switch 30 may comprise a normally open relay switch adapted to be closed, by an associated coil or solenoid 31, when and so long as said coil is energized, as from the source 25.

The X-ray beam 17 may be applied to any useful purpose, including the therapeutic irradiation of the body 33 of a patient, which may be supported for treatment in the path of the beam 17, as on a treatment table 34. The beam 17 may also be usefully employed for the production of X-ray shadow pictures of the body 33 or other object to be pictured, by mounting a sheet of X-ray sensitive film material 35, preferably enclosed in a suitable light-tight cassette 36 in the path of the beam 17 on the side of the body 33 remote from the X-ray source, so that the film material 35 may be exposed to the action of the ray beam after it shall have passed through the body 33, to thus impose, upon the film, an X-ray shadow picture of the body, in accordance with known X-ray photography procedures, which may include the arrangement of a Bucky diaphragm 37 between the body being pictured and the cassette enclosed film.

In thus applying X-rays to the bodies of patients for either therapeutic or radiographic purposes, it is highly desirable to determine accurately the total amount or quanta of X-rays applied to the body during the exposure interval, and to terminate the exposure precisely as and when a predetermined or selected X-ray quanta has been applied. Such accuracy is highly desirable for radiographic purposes in the interests of obtaining exposed films of optimum density. The accurate determination of ray quanta during X-ray therapy is likewise of importance, especially where the desired exposure is near the safe exposure limit for the subject being treated.

In the interests of accuracy, both film exposure for optimum density and safe therapy exposure intervals ought to be measured in terms of X-ray quanta applied during the exposure interval. Heretofore it has been conventional to determine ray exposure intervals by accurately adjusting the electron driving potential and cathode energizing power applied to the X-ray generating tube, in order to produce an X-ray beam of desired quality or intensity, and then applying the beam during a predetermined time interval to thus expose the object being treated or pictured to a desired X-ray quanta. Such exposure may be accomplished by energizing the solenoid 31 during a selected time interval under the control of special timing equipment, to thereby close the switch 30, during the selected interval, and to open the same, or if desired another switch in series therewith, at the expiration of the selected interval.

It will be seen, however, that the desired exposure, measured in terms of quanta, will be attained only if, during the exposure period, the selected electron driving potential, as well as the selected cathode excitation, are accurately maintained. Any variation in either cathode excitation or electron driving potential will alter the X-ray quanta delivered during the time exposure interval. Where the exposure is thus determined in terms of time and X-ray tube loadings, it is essential not only to provide for maintaining absolutely constant the voltage and current available at the source 25, but it is also necessary to assure the accurate adjustment of the voltage selectors 27 and 29. These must be set not only in accordance with the selected exposure time interval, but also must be adjusted more or less empirically, as from auxiliary technique charts, depending upon the size, weight, thickness and constituent material of the body 33.

The necessary adjustment of the voltage selecting means 27 and 29 is, of course, determined to some extent by the judgement of the roentgenologist in charge of the operation of the apparatus, and such adjustments accordingly are subject to the element of human error. In order to avoid the inherent disabilities in the mechanical timing of X-ray exposure intervals, means may be provided for measuring X-ray quanta delivered through the body 33 and for de-limiting the exposure interval when a predetermined total X-ray quanta has been thus delivered upon and through the body 33.

To this end, X-ray sensitive means may be disposed in any convenient location in the path of the X-ray beam 17. As shown, the sensitive means may be mounted upon the side of the body 33 remote from the X-ray source, so that rays, in reaching the sensitive means, will first pass through the body 33. Any suitable ray sensitive means may, of course, be employed for ray detecting purposes. To that end, the sensitive means may embody a detector element or cell 38 which may comprise crystalline, ray sensitive semi-conductor material, such as cadmium or mercury sulphide or cadmium selenide, of the sort disclosed in the copending application for United States Letters Patent Serial No. 250,141, filed October 6, 1951, for Interval Timing Apparatus, invented by John E. Jacobs. Such crystalline semi-conductor materials have impedance characteristics which vary precisely in proportion to the quanta of X-rays applied thereto, and, consequently, a unit 38 comprising such ray sensitive materials may be employed in a suitable electrical integrating system to precisely measure the X-ray quanta applied through the body 33 and upon the sensitive detector element 38.

Alternately, the element 38 may comprise a photosensitive cell of the sort disclosed in United States Letters Patent No. 2,401,289 of May 28, 1946, covering a Photoelectric Timer System invented by Russell H. Morgan and Paul C. Hodges, such photoelectric unit serving to measure X-ray quanta applied upon a sheet of ray sensitive fluorescent material 38' in terms of the amount of light emitted by the fluorescent sheet under the influence of X-rays impinging thereon.

The element 38, whether the same is directly ray sensitive crystalline material, such as cadmium sulphide, or whether the same is a photo cell actuated by light rays emitted by an X-ray sensitive fluorescent screen 38', may be electrically connected in an electrical translation system 41 for the operation of the switch 30, in order to open the same at the conclusion of a measured exposure interval. As shown, the translation system 41 may comprise means for integrating the response of the detector unit 38, to thereby measure total X-ray quanta delivered during an exposure interval being measured, and for actuating a load device 42 for the disablement of the X-ray source 11 at the conclusion of the exposure interval. To these ends, the translation system 41 may embody a thyratron tube 43, the same comprising a gas filled electron flow device having a cathode 44, an anode 45, and a control grid 46. The cathode and anode 44 and 45 may be interconnected in an output circuit including a suitable power source 47 and the load device 42 which, in the illustrated embodiment, comprises the operating coil 48 of a normally closed relay switch 49.

The control grid 46 of the thyratron may be connected in a control circuit in which the sensitive element 38 is also operatively connected; and means is provided for electrically energizing the grid 46 for the control of the tube 43 in accordance with total current caused to flow in the element 38 during an X-ray exposure interval to be timed. The sensitive element 38, accordingly, may be electrically connected with the grid 46 of the thyratron through a conductor 40. The grid control circuit may also include a preferably uni-directional power source 50 and a variable resistor 51 interconnected in series with the power source and with the sensitive element 38 through a conductor 39. The control circuit also includes an integrating condenser 52 connected between the grid of the thyratron 43 and a suitable source 53 of negative grid biasing power for the thyratron.

The thyratron 43 comprises a triggering device adapted to become conducting between the anode and cathode thereof for the operation of the load device 42 from the power source 47 whenever the voltage applied between the grid and cathode of the trigger device reaches a predetermined value, such as, say, 2 volts of negative bias potential on the grid 46 with respect to the cathode 44, the same being a function of the thyratron plate characteristic. So long as the negative potential on the grid 46, with respect to the cathode 44, remains greater than 2 volts, the thyratron will remain in inactive non-conducting condition.

The control circuit may also include a normally closed disabling switch 54, interconnected in parallel across the integrating condenser 52, and a normally open anode circuit switch 58, connected between the anode 45 of the thyratron and ground in series with the power source 47 and the relay coil 48, the cathode of the thyratron being grounded, as shown, and hence connected with the grounded side of the power source 47. So long as the anode circuit switch 58 remains open, the valve 43 will continue to be inactive because its anode circuit will be open at the switch 58. Furthermore, while and so long as the switch 54 remains in closed position, a negative bias, of potential substantially in excess of that at which the thyratron fires, will be applied upon the thyratron grid 46 from the source of biasing potential 53. The condenser 52 also will remain inactive so long as the same is short-circuited by the closed switch 54, the grid connected side of the condenser 52 being at a potential with respect to the cathode 44 equal to the negative potential applied on the grid 46.

Means is provided for opening the switch 54 coincidentally with the closure of the switch 30 for the actuation of the X-ray generator at the start of an exposure interval. Accordingly, when the switch 54 opens and switch 58 simultaneously closes, the thyratron will continue to be inactive because biased beyond cut-off. In this connection, the condenser 52 will have no charge in so far as the grid of the thyratron is concerned, but its grid connected side will be at the negative potential with respect to said cathode 44 as supplied by the power source 53. As electrical current is delivered from the detector 38 through the conductor 40 to the grid 46 of the thyratron and the grid connected side of the condenser 52, as the result of X-ray excitation of the detector 38, the grid connected side of the condenser 52 will progressively lose negative electrons, thereby becoming more and more positively charged. After an interval determined by the current flow, the capacity of the condenser 52, and the bias voltage applied on the grid 46 while the switch 54 is closed, the difference of potential between the control grid and cathode of the thyratron will increase to the bias voltage level at which the thyratron may fire. When the thyratron is thus fired or placed in operation, it will energize the relay coil 48 and cause the switch 49 to open. After being triggered, the thyratron 43 will continue in operation until the switch 55 is reclosed and the switch 58 reopened.

Any preferred means may be employed for utilizing the foregoing operation of the thyratron for the control of the X-ray source 11. As shown in Fig. 1 of the drawings, such control may be accomplished by providing a relay 55 having an actuating coil 56, a normally open switch 57, the normally open switch 58, and the normally closed switch 54. By energizing the coil 56, the normally closed switch 54 will be opened, and thereafter will remain open until the coil 56 is again de-energized. Conversely, the switches 57 and 58 may close when the coil 56 is energized, and thereafter may remain closed so long as said coil remains energized. The coil 56 may be connected with the power source 25 in series with, and hence under the control of, a normally open control switch 59, preferably of the manually operable type. The normally open switch 57 may also be connected in series with the normally closed relay switch 49 and the operating coil 31 of the normally open switch 30, to form a series circuit connected with the power source 25. The normally open switch 58 may be interconnected in the plate circuit of the thyratron, in series with the power source 47 and the operating coil 48 of the load device 42.

In order to replace the X-ray generating tube 11 in operation for the application of the X-ray beam 17 to the body 33, the sensitive picturing material 35, and the detector means, the switch 59 may be closed, as by the action of the roentgenologist in operative charge of the equipment, thereby energizing the relay coil 56 to open the switch 54 and to close the switches 57 and 58. Closure of the switch 57 will complete a relay energizing circuit through the switch 49, which at such time is in closed condition, and the operating coil 31 to thereby cause closure of the normally open switch 30, in order to start the X-ray generator 11 in operation. Thereafter, the X-ray generator will remain in operation until a predetermined X-ray exposure, measured in terms of X-ray quanta, shall have been applied to the body 33. Thereupon, the thyratron tube 43 may be caused to fire as the result of the integrating action of the condenser 52. When the thyratron thus is activated, it will complete an operating circuit through the switch 58, which at such time is in closed condition, in order to energize the coil 48 and thus open the energizing circuit of the coil 31 at the switch 49. The coil 31 being thus de-energized, the switch 30 will open, thereby removing the electron driving potential from the anode and cathode of the X-ray tube, and thus disabling the same as an X-ray source, whereby the application of the X-ray beam upon the body 33 will be discontinued.

It will be seen from the foregoing that the integrating condenser 52 may be operated substantially exactly for the measurement of X-ray quanta applied to the body 33 during an exposure interval in order to fire the thyratron precisely when the body has received a preselected amount of X-ray irradiation. It will be obvious, also, that operation of the X-ray generator 11 will be discontinued as the result of the operation of the thyratron after a short time interval required for the successive operation of the switches 49 and 30. Ordinarily, the operation of such relay switch means requires an interval of the order of one-fiftieth second. Such delayed switch operation, accordingly, is a factor which, if disregarded, will introduce errors in the determination of X-ray exposure intervals, such errors becoming proportionally greater as the measured exposure interval becomes smaller.

In order to compensate for operational lag of the control relay means, the present invention provides for anticipating the termination of the exposure interval and for firing the thyratron sufficiently in advance of the end of the exposure interval to cause discontinuation of the operation of the X-ray source 11 precisely at the end of the exposure interval as measured by the condenser 52. The operation contemplated by the present invention is obtained by causing the bias voltage delivered from the source 53 to vary during the course of the exposure interval being measured so that, regardless of the rate of integration or the duration of the interval being measured, the thyratron will be caused to operate sufficiently in advance of the end of the measured interval to compensate for the operational lag of relay switching means driven by the thyratron.

Figure 3:
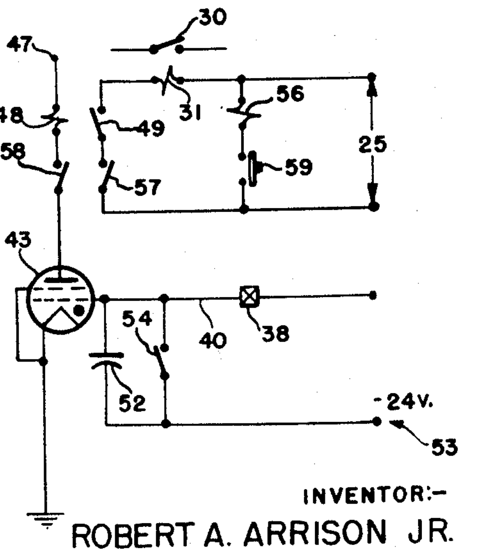
Figure 4:
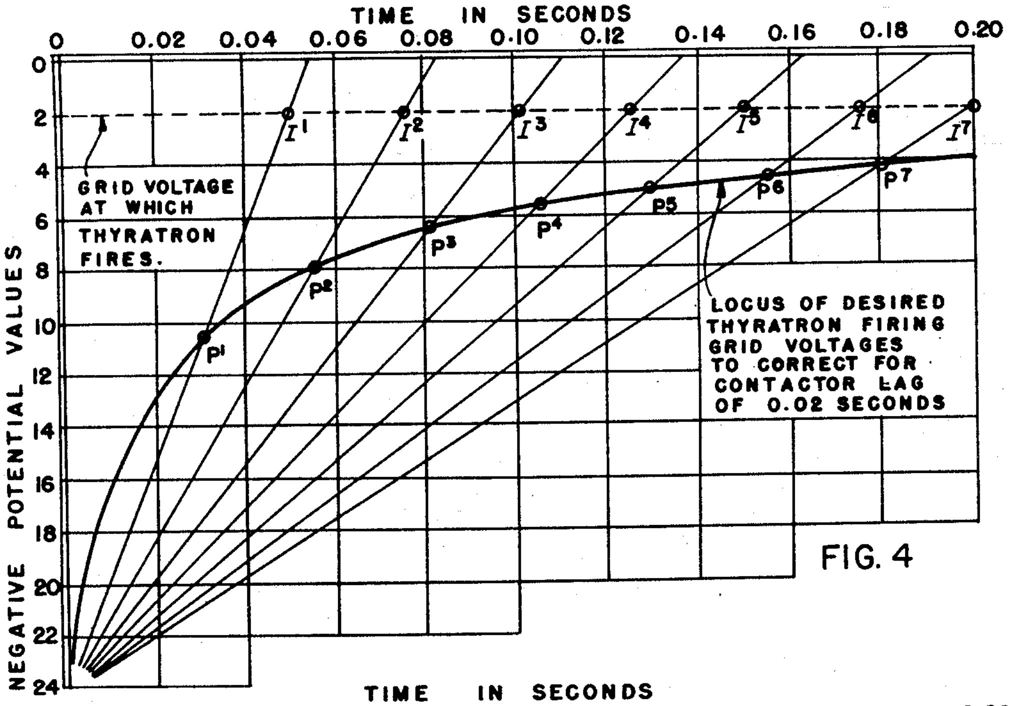
Figs. 4 and 5 are graphical representations of electrical relationships involved in the calibration and operation of the system shown in Fig. 1.

In order to explain the manner in which the end of an interval being measured may be anticipated as aforesaid, it should be understood that a thyratron valve is ordinarily operated by applying a negative bias voltage $V_b$ of fixed value between the control grid and the usually grounded cathode of the thyratron, as indicated, for example, in Fig. 3 of the drawings. Fig. 4 is a graphical representation disclosing the charging characteristics of the condenser 52, where $V_b$ is a constant value, in terms of elapsed time between a negative starting potential of 24 volts and a terminal negative potential of 2 volts, for various values of charging current supplied to the condenser 52 through the conductor 40 under the control of the sensitive detector 38. The charging current thus supplied to the condenser 52 will, of course, vary with the quality or intensity of the X-rays comprising the beam 17, the distance between the ray source 11 and the detector means, the thickness of the object 33, and the ray absorbing quality of its constituent material.

The several lines $I^1$—$I^7$ depicted in Fig. 4 of the drawings thus represent the charging rates of the condenser 52 from a starting potential of —24 volts, such as might be applied upon the grid 46 of the thyratron, when the switch 54 is closed, to a potential of —2 volts, the same being the potential at which the thyratron 43 becomes operative, the various lines illustrating the charging action of the condenser 52 under various possible operating conditions. The equation of these lines is $$V_g=V_b+(I.T/C)$$

where $V_g$ is the variable voltage between grid and cathode of the thyratron, $V_b$ represents a constant value of voltage supplied from the source 53, I is the charging current of the condenser 52, C is the capacity of the integrating condenser 52, and T is elapsed time.

The operational lag of the relay switches 30 and 49 may be determined emperically for any particular installation, the same ordinarily being of the order of one-fiftieth second. By measuring from the point on each line $I^1$—$I^7$ representing the normal thyratron firing grid potential a graphical distance corresponding with one-fiftieth second, a series of points $P^1$—$P^7$ may be determined, said points lying in a curved line representing, in the graph, the locus of required thyratron grid voltages to cause the thyratron to operate one-fiftieth of a second before the condenser 52 becomes charged to the required normal thyratron firing grid potential. If the thyratron were caused to fire at the voltages represented by the locus of the points $P^1$—$P^7$, the inherent operational lag of the relay switches 49 and 30 would result in precise termination of the exposure interval. The locus of the points $P^1$—$P^7$ is a function of time only. Hence, if the thyratron firing grid potential could be controlled in accordance with such locus, satisfactory switch operating lag compensation would result; and it is possible to accomplish such control by suitably varying the voltage upon the second control grid of a four-element thyratron valve. It is preferable, however, to accomplish the desired operation of the thyratron by continuously varying the bias voltage delivered from the source 53.

Figure 5:
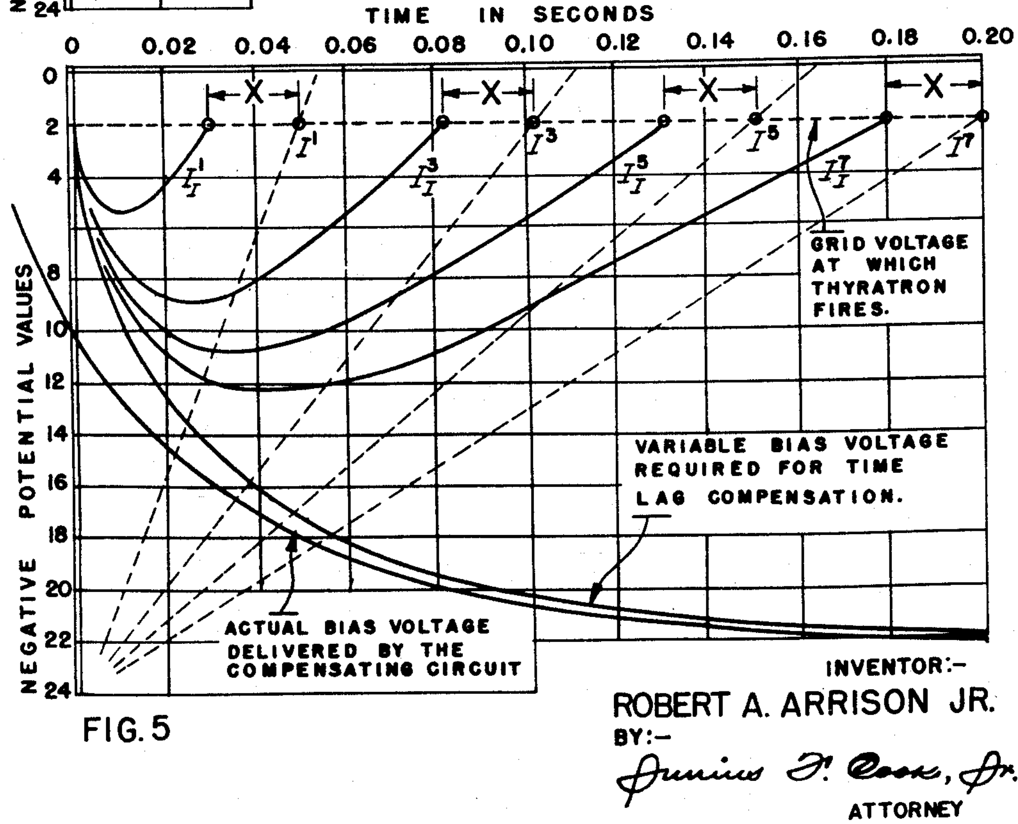

Fig. 5 shows the desired variation of bias voltage as a function of time required to be applied upon the thyratron grid remote side of the condenser 52 during the timing of an exposure interval, in order to provide for control of the thyratron in accordance with firing conditions indicated by the locus of the points $P^1$—$P^7$ in Fig. 4. The equation for this function is $$V_b = V_{b\,max}\left(1-\frac{K}{T+K}\right)$$

in which $V_{bmax}$ is the steady value of maximum voltage delivered by the source 53, and K is the operational time lag to be compensated for by subtracting the same from each exposure interval measurement, the same commonly comprising a time interval of the order of 0.02 second.

In Fig. 5, also, is shown the loci of thyratron grid voltage values for phototube currents $I'_1$, $I^3_1$, $I^5_1$, and $I^7_1$, corresponding with exposure intervals, respectively, of 0.05, 0.1, 0.15, and 0.2 second. The equation for determining these loci is $$V_g = V_b + (I.T/C)$$

which by substitution for $V_b$, assuming K to be 0.02 seconds, becomes $$V_g = V_{b\,max}\left(1-\frac{0.02}{T+0.02}\right)+I.T/C$$

The dotted lines $I'$, $I^3$, $I^5$, $I^7$ in Fig. 5 represent the loci of thyratron grid voltage where the voltage delivered by the power source 53 is a constant value equal to $V_{bmax}$, as in the system shown in Fig. 3, thus demonstrating how a bias voltage supplied from the power source 53 and varying as a function of time would satisfy the required conditions.

Figure 2:
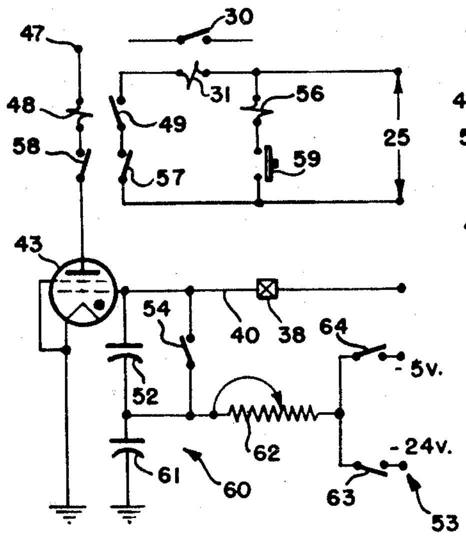
Figs. 2 and 3 are schematic diagrams.

The desired variable bias to be supplied by the power source 53, as shown in Figs. 1 and 2, may be accomplished by interposing a resistor-condenser network 60 between the power source 53 and the thyratron grid remote side of the integrating condenser 52. As shown, this resistor-condenser network 60 may include a condenser 61 connected between the thyratron grid remote side of the condenser 52 and ground, and a preferably adjustable resistor 62 connected between the interconnected sides of the condensers 52 and 61 and the power source 53.

The values of resistance and capacity required for the elements of the network 60 may be determined in order to cause the bias voltage delivered from the source 53 upon the thyratron grid remote side of the integrating condenser 52 to vary as closely as possible in conformity with the desired variable bias voltage function $V_b$ shown in Fig. 5. In that connection, the equation of an exponential curve of simplest form is $$V_b(T) = V_{b\,max}(1-e^{-T/RC})$$

The above exponential function corresponds closely with the theoretically required variable bias voltage function $V_b$, said exponential function being shown in Fig. 5 and labeled as the actual bias voltage delivered by the timing circuit.

Where the values of capacity and resistance in the network 60 are chosen to provide the foregoing exponential function, advantage may be taken of the fact that the compensator circuit can be actuated prior to the beginning of the actual exposure interval, that is to say, the exposure switch means 55 may include a normally open switch 63 and a normally closed switch 64 adapted for operation under the control of the coil 56 in response to closure of the switch 59. The resistor 62 may be connected through the normally open and the normally closed switches 63 and 64, respectively with relatively high and relatively low negative bias voltage values supplied by the source 53. To this end, the source of biasing power 53 may comprise a uni-directional source of power 65 and a resistor 66 having taps respectively connected through the switches 63 and 64 with the adjustable resistor 62, said taps, as shown, supplying negative bias voltage at values of 24 volts and 5 volts, respectively.

The compensating circuit thus may be put into operation during the short interval, of the order of 0.015 seconds, required to actuate the switch 30 following operation of the switch means 55. The exponential function, adjusted for such change, may be expressed by the following equation:

$$V_b(T) = V_{b\,max}(1-e^{-(T+0.015)/RC})$$

The most critical range within which the actual bias voltage should closely match the theoretically desirable voltage is probably the region in which T equals 0.05 to 0.10 second. For an exposure of 0.05 second, the thyratron should trigger at 0.03 second. As a consequence, $$V_b(T=0.03) = V_{b\,max}\left(1-\frac{0.02}{0.03+0.02}\right)=0.6V_{b\,max}$$

If the actual exponential curve is to match the theoretical curve when T equals 0.03, then $$V_b(T=0.03)=0.6V_{b\,max}=V_{b\,max}(1-e^{-(0.03+0.015)/RC})$$

whence $e^{-0.045/RC}=0.4$, and $RC=0.0492$.

If RC be arbitrarily equated with the value 0.05, then $$V_b(T)=V_{b\,max}(1-e^{-(T+0.015)/0.05})$$

The most satisfactory match is obtained where $$V_b(T)=-5+19(1-e^{-(T+0.015)/0.05})$$

The value −5 represents the bias voltage value applied prior to and at the commencement of the measurement of an exposure interval. Such initial negative bias, being in excess of the voltage at which the thyratron will fire, serves to prevent the thyratron from improperly firing at the interval $T=0$.

It will be seen from the foregoing that in stand-by condition, the switches 54 and 64 being closed, a negative bias voltage at a value of the order of 5 volts will be applied from the source 53 through the switch 64 and the resistor 62 to the grid 46 of the thyratron and to both sides of the integrating condenser 52. Upon closure of the switch 59 to initiate an exposure interval, closure of the switch 63 and the opening of the switches 54 and 64 will result in the application of a negative bias voltage of the order of −24 volts from the power source 53 through the switch 63 and the resistor 62 to the interconnected sides of the condensers 52 and 61. This voltage, because of the time constant of the resistor-condenser network 60, will not immediately reach its full value on the thyratron grid remote side of the condenser 52, but the voltage applied on said side of said condenser will follow the exponential curve of actual bias voltage shown in Fig. 5, as the interval being timed progresses. As a consequence, the application of charging current upon the condenser 52 through the conductor 40 from the detector means 38 will result in the operation of the thyratron valve 43 in the desired manner.

The switch operating lag compensation features of the present invention are of very appreciable value in obtaining the accurate timing of X-ray exposure intervals, particularly where the intervals are of duration shorter than 0.1 second. By way of indication of the degree of improvement in timing accuracy provided in equipment embodying the teachings of the present invention, it may be shown that, as compared with best possible performance of timing equipment of the sort shown in Fig. 3, the system of the present invention, as shown in Figs. 1 and 2, for exposure intervals of 0.1 second shows an average error of 2% as compared with an average error of 20% where interval timing is accomplished with apparatus of the sort shown in Fig. 3.

With applicant's time lag compensation equipment an average error of 4% is encountered in measuring exposure intervals of the order of 0.05 second, whereas uncompensated systems show an average error of 40% in timing intervals of the order of 0.05 second.

Where the interval being timed is of the order of 0.025 second, the average error encountered in using time lag compensating apparatus of the present invention may be of the order of 15%, as compared with average error of the order of 60% encountered in the operation of timing equipment embodying no time lag compensating apparatus embodying the present invention.

It is throught that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. The method of controlling the firing instant of a gaseous conduction electron flow device having a control grid and a condenser connected with said grid, which consists in charging the condenser progressively to alter the voltage applied on the grid toward firing potential, while simultaneously changing a bias voltage applied upon the grid remote side of the condenser.

2. The method of controlling the firing instant of a gaseous conduction electron flow device having a control grid and a condenser connected with said grid, which consists in charging the condenser progressively to render the voltage applied on said grid progressively less negative, while simultaneously increasing the negativity of a bias voltage applied upon the grid remote side of the condenser.

3. The method of controlling the firing instant of a gaseous conduction electron flow device having a control grid and a condenser connected with said grid, which consists in charging the condenser progressively to alter the voltage applied on said grid toward firing potential, while simultaneously changing exponentially the bias voltage applied upon the grid remote side of the condenser.

4. The method of determining an X-ray exposure interval which consists in controlling the firing instant of a gaseous conduction valve having a control grid and a grid connected condenser by progressively charging the condenser, in accordance with the intensity of rays emitted during the interval being measured, to thereby progressively alter the voltage applied on said grid toward firing potential, and simultaneously changing a bias voltage applied upon the grid remote side of the condenser.

5. Control apparatus comprising a gaseous conduction valve having a control grid, and means for precisely controlling the firing instant of said valve, including a condenser connected with said control grid, means to progressively charge the condenser to alter the voltage applied upon said grid toward firing potential, and means for applying a variable bias upon the grid remote side of said condenser.

6. Control apparatus comprising a gaseous conduction valve having a control grid, and means for precisely controlling the firing instant of said valve, including a condenser connected with said control grid, means to progressively charge the condenser to alter the voltage applied upon said grid toward firing potential, and means comprising a power source and an associated resistance-capacitance biasing circuit having selected time lag characteristics for applying a variable bias upon the grid remote side of said condenser.

7. Control apparatus comprising a gaseous conduction valve having a control grid, and means for precisely controlling the firing instant of said valve, including a condenser connected with said control grid, means to progressively charge the condenser to alter the voltage applied upon said grid, and means comprising a power source and an associated resistance-capacitance biasing circuit having exponential time lag characteristics for applying a variable bias upon the grid remote side of said condenser.

8. Interval measuring apparatus comprising a gaseous conduction valve having a control grid, and means for precisely controlling the firing instant of said valve, including a condenser connected with said control grid, bias means for applying potential on said control grid and the grid connected side of the condenser to hold said valve inactive, means to apply charging current to said condenser, during the interval to be measured, to fire said valve at the end of the measured interval when said condenser has become charged to a predetermined voltage level, at its grid connected side, and means for applying a variable bias potential to the grid remote side of the condenser in order to correspondingly alter the firing instant of the valve.

9. Interval measuring apparatus comprising a gaseous conduction valve having a control grid, and means for precisely controlling the firing instant of said valve, including a condenser connected with said control grid and relay devices operatively connected with the valve for actuation as and when the valve fires, bias means for applying potential on said control grid and the grid connected side of the condenser, at a negative voltage value sufficient to hold said valve inactive, means rendered operative at the commencement of an interval to be measured for applying charging current to said condenser during the interval to be measured, whereby to fire said valve at the end of the measured interval, when said condenser shall have become charged to a predetermined relatively more positive firing voltage level, at its grid connected side, and means for applying a variable bias potential to the grid remote side of the condenser in order to fire the valve sufficiently in advance of the end of the interval being measured to cause operation of said relay devices precisely at the conclusion of the interval being measured.

10. Ray exposure interval timing apparatus comprising a gaseous conduction valve having a control grid, and means for precisely controlling the firing instant of said valve, including a condenser connected with said grid, ray sensitive means for measuring ray quanta delivered during an exposure interval to be timed and for delivering current, in amount corresponding with such measured quanta, to said condenser in order to correspondingly charge the same and thereby alter the voltage applied on said grid toward firing potential, and means for applying a variable bias upon the grid remote side of the condenser to correspondingly alter the instant of firing of the valve.

11. Ray exposure interval timing apparatus comprising a gaseous conduction valve having a control grid, and means for precisely controlling the firing instant of said valve, including a condenser connected with said grid, ray sensitive means for measuring ray quanta delivered during an exposure interval to be timed and for delivering current, in amount corresponding with such measured quanta, to said condenser in order to correspondingly charge the same and thereby alter the voltage applied on said grid toward firing potential, and means comprising a power source and an associated resistance-capacitance biasing circuit having selected time lag characteristics for applying a variable bias upon the grid remote side of said condenser to correspondingly alter the instant of firing of the valve.

12. Ray exposure interval timing apparatus comprising a gaseous conduction valve having a control grid, and means for precisely controlling the firing instant of said valve, including a condenser connected with said grid, ray sensitive means for measuring ray quanta delivered during an exposure interval to be timed and for delivering current, in amount corresponding with such measured quanta, to said condenser to correspondingly charge the same and thereby alter the voltage applied on said grid toward firing potential, and means comprising a power source and an associated resistance-capacitance biasing circuit having exponential time lag characteristics for applying a variable bias upon the grid remote side of said condenser in order to correspondingly alter the instant of firing of the valve.

13. Ray exposure interval timing apparatus comprising a gaseous conduction valve having a control grid, and means for precisely controlling the firing instant of said valve, including a condenser connected with said control grid, bias means for applying potential on said control grid and the grid connected side of the condenser to hold said valve inactive, ray sensitive means for measuring ray quanta delivered during an exposure interval to be timed and for delivering current, in amount corresponding with such measured quanta, to said condenser, during the interval to be measured, to thereby fire said valve when said condenser shall have become charged to a predetermined voltage level at its grid connected side, and means for applying a variable bias potential to the grid remote side of the condenser in order to correspondingly alter the instant of firing of the valve as a function of elapsed time from the commencement of the measured interval.

14. Ray exposure interval timing apparatus comprising a gaseous conduction valve having a control grid, and means for precisely controlling the firing instant of said valve, including a condenser connected with said grid and relay devices operatively connected with the valve for actuation as and when the valve becomes active, bias means for applying potential on said control grid and the grid connected side of the condenser, at a negative voltage value sufficient to hold the valve normally inactive, ray sensitive means for measuring ray quanta delivered during an exposure interval to be timed and for delivering current, in amount corresponding with such measured quanta, to said condenser during the interval to be measured, whereby to fire said valve to operate said relay devices when said condenser shall have become charged to a predetermined relatively more positive voltage level, at its grid connected side, and means for applying a variable bias potential to the grid remote side of the condenser in order to fire the valve sufficiently in advance of the end of the measured interval to cause operation of said relay devices precisely at the conclusion of said interval.

15. Interval measuring apparatus comprising a gaseous conduction valve having a control grid, a condenser connected with said control grid and relay devices operatively connected with the valve for actuation as and when the valve becomes active, bias means for normally applying negative potential of the order of five volts upon the grid connected side of the condenser to normally hold the valve inactive, means rendered operative at the commencement of an interval to be measured for applying interval measuring current to charge said condenser progressively, during the interval being measured, to thereby render said valve active to operate said relay devices when said condenser shall have become charged to a predetermined relatively more positive voltage level at its grid connected side, and means for applying a variable bias potential progressively changing from a negative voltage of the order of five volts to a negative voltage of the order of twenty-four volts, at the grid remote side of the condenser in order to correspondingly activate the valve sufficiently in advance of the end of the interval being measured to cause operation of said relay devices precisely at the conclusion of the interval being measured.

16. Interval measuring apparatus comprising a gaseous conduction valve having a control grid, a condenser connected with said control grid and relay devices operatively connected with the valve for actuation as and when the valve becomes active, bias means for normally applying negative potential of the order of five volts upon the grid connected side of the condenser to normally hold the valve inactive, means rendered operative at the commencement of an interval to be measured for applying interval measuring current to charge said condenser progressively, during the interval being measured, to thereby render said valve active to operate said relay devices when said condenser shall have become charged to a predetermined relatively more positive voltage level at its grid connected side, and means for applying a variable bias potential progressively changing from a negative voltage of the order of five volts exponentially to a negative voltage of the order of twenty-four volts, at the grid remote side of the condenser in order to correspondingly activate the valve sufficiently in advance of the end of the interval being measured to cause operation of said relay devices precisely at the conclusion of the interval being measured.

17. Apparatus for limiting a ray exposure interval to provide for application of a predetermined quanta of ray energy, in an irradiation zone during the exposure interval comprising relay means operable to initiate and terminate the delivery of ray energy in said zone, a ray sensitive device positioned to receive rays, control means operable to actuate said relay means to initiate the exposure interval, a biasing circuit embodying a resistance-condenser network for developing a variable biasing voltage, a control condenser connected between the ray sensitive device and the biasing circuit, to thereby accumulate charge under control of the ray sensitive device in accordance with the quanta of impinging rays, said relay means including a normally closed switch connected across the control condenser for establishing an initial condition wherein the condenser has no charge, said normally closed switch being operable to open upon initiation of the exposure interval, a normally open switch operable to close upon initiation of the exposure interval to apply a selected bias potential upon the resistance-condenser network, a gaseous conduction device having a control grid connected with the control condenser, and hence energized at the voltage appearing across the control condenser corresponding to the charge accumulated from the ray sensitive device, as modified by the variable bias voltage supplied by the biasing circuit, said gaseous conduction device being controllingly connected with said relay means to terminate the exposure interval.

18. Apparatus for limiting a ray exposure interval to provide for application of a predetermined quanta of ray energy in an irradiation zone during the exposure interval comprising relay means operable to initiate and terminate the delivery of ray energy in said zone, a ray sensitive device positioned to receive rays delivered in said zone, control means operable to actuate said relay means to initiate the exposure interval, a gaseous conduction device having a control grid, said gaseous conduction device being connected to actuate said relay means to terminate the exposure interval, a control condenser having one side connected to the ray sensitive device and the control grid of the gaseous conduction device, a variable biasing circuit including a biasing condenser connected to be charged from a suitable power source, said variable biasing circuit being connected to the control condenser at the side remote from the ray sensitive device and the control grid, said relay means embodying a disabling switch connected across the control condenser for establishing an initial condition wherein the control condenser has no charge, said relay means embodying bias switches connected with said power source and said biasing condenser for establishing a selected initial biasing voltage across the biasing condenser and for applying a different voltage to the biasing condenser during the exposure interval.

19. Apparatus as set forth in claim 18 wherein the disabling switch is normally closed and held open during the exposure interval, said bias switches including a normally closed switch open during the exposure interval for establishing the initial biasing voltage upon the biasing condenser and a normally open switch closed during the exposure interval for applying a desired voltage upon the biasing condenser during the exposure interval.

20. Apparatus for limiting a ray exposure interval to provide for application of a predetermined quanta of ray energy in an irradiation zone, during the exposure interval, comprising relay means operable to initiate and terminate the delivery of ray energy in said zone, a multiple switch relay including a normally open switch closable to actuate the relay means for the initiation of the exposure interval, an interval terminating relay operable to actuate the relay means for the termination of the exposure interval, said multiple switch relay including a normally open control switch, a ray sensitive device disposed in position to receive rays delivered in said zone, a gaseous conduction tube having a control grid and an anode and cathode connected in circuit with said interval terminating relay through said normally open control switch, a control condenser connected in circuit with a power source and said ray sensitive device, and having one side connected to said control grid, a biasing condenser connected to the other side of said control condenser, said multiple switch relay embodying normally open and normally closed biasing switches for applying desired electrical potentials on said biasing condenser respectively during and prior to said exposure interval, said multiple switch relay also including a normally closed disabling switch connected across said control condenser, and means operable to throw said multiple switch relay from normal to shifted position to initiate the exposure interval.

References Cited in the file of this patent

UNITED STATES PATENTS

| | | |
|---|---|---|
| 1,939,243 | Twyman | Dec. 12, 1933 |
| 2,232,373 | Dorst | Feb. 18, 1941 |
| 2,252,530 | Sweeny et al. | Aug. 12, 1941 |
| 2,401,289 | Morgan et al. | May 28, 1946 |
| 2,463,985 | Linde | Mar. 8, 1949 |
| 2,469,076 | Rabinowitz | May 3, 1949 |
| 2,542,264 | Smith | Feb. 20, 1951 |
| 2,559,508 | Meier | July 3, 1951 |
| 2,594,104 | Washburn | Apr. 22, 1952 |
| 2,704,326 | Whitson | Mar. 15, 1955 |